United States Patent [19]

Parker

[11] 3,898,665

[45] Aug. 5, 1975

[54] MULTIPLEX SYSTEM WITH CIRCUIT FOR RF DEVICE

[75] Inventor: Thomas Weston Parker, Los Gatos, Calif.

[73] Assignee: Addington Laboratories Incorporated, Santa Clara, Calif.

[22] Filed: Aug. 5, 1974

[21] Appl. No.: 494,498

[52] U.S. Cl. .................... 343/200; 325/23; 333/10

[51] Int. Cl. ............................................ H04j 1/12

[58] Field of Search ...... 343/200, 205, 207; 325/21, 325/23, 24, 301, 305, 51, 125, 128–130; 333/10, 11, 13; 307/202

[56] References Cited

UNITED STATES PATENTS

| | | | |
|---|---|---|---|
| 2,991,471 | 7/1961 | Pritchard | 325/23 |
| 3,471,787 | 10/1969 | Morrison | 325/23 |
| 3,480,733 | 11/1969 | Morita et al. | 343/200 |

FOREIGN PATENTS OR APPLICATIONS

| | | | |
|---|---|---|---|
| 1,591,665 | 10/1970 | Germany | 325/305 |

*Primary Examiner*—George H. Libman
*Attorney, Agent, or Firm*—Limbach, Limbach & Sutton

[57] ABSTRACT

An RF multiplexer connects a common RF transmission line to a plurality of RF communication devices. In normal operation the multiplexer protects a receiver in such devices from damaging RF power. To provide further isolation in the event of misadjustment of the system, a protection circuit is inserted before each device, the circuit including means for shunting received RF to a load when undesired RF power is directed toward the device.

7 Claims, 2 Drawing Figures

MULTIPLEX SYSTEM WITH CIRCUIT FOR RF DEVICE

BACKGROUND OF THE INVENTION

This invention relates to RF diplexers or in a more general sense to RF multiplexer apparatus where a plurality of RF communication devices, such as receivers, transmitters and transceivers are to be connected to a common RF transmission line and antenna.

In one typical prior art diplexer, a common antenna is connected to a diplexing network which provides two outputs through protection circuits to the RF communication devices. The diplexing network is typically a plurality of band reject filters which are tuned so as to prevent the RF of the nominal frequency of the transmitted signal from one channel from reaching the second channel and vice versa. The protection circuits are typically a complex arrangement of bandpass and band stop filters mechanically ganged so as to be tunable along with the band reject filters of the diplexing network. Such arrangements are not only cumbersome and expensive to build, but are susceptible to misadjustment by untrained operators.

It is necessary, however, to provide some type of protection circuitry to provide a backup to the diplexing network. For example, a diplexing network may be arranged so as to prevent a signal at frequency $F_1$ and/or $F_1$ and $F_2$, or several frequencies from reaching the receiver or the receiver portion of the transceiver in a particular channel. However, the network fails in the case where RF power is applied to that network at a frequency other than the tuned rejection frequencies. Such operation can occur when a transmitter is improperly tuned or is generating spurious or harmonic signals.

SUMMARY OF THE INVENTION

In accordance with the teachings of the present invention, an RF multiplexer apparatus is provided which includes a protection circuit which operates in response to any RF power flowing toward the communication device, such as would ordinarily damage a receiver or the receiving portion of a transceiver. The circuit is completely passive and requires no external power other than the power flowing to or from the RF communication device with which it is associated. No filters are required, nor is any tuning of the circuit required. The circuit is thus particularly useful in applications employing untrained operators.

An RF multiplexer means or multiplexing network (in the case of a two channel system, a diplexing network) is connected between the common RF transmission means and the RF communication devices. Band reject filters in the RF multiplexer are tuned to reject the frequencies of transmitters in the various channels. For example, the band reject filter in a first channel would be tuned to reject the transmitter frequencies of all the other channels so as to prevent RF power from reaching the receiver in that particular channel. The problem arises when a signal is present from one of the other transmitters at a frequency other than those frequencies of the band reject filter in the particular channel. In that case, the protection circuit is essential to provide isolation of the receiver from the undesired RF power.

In accordance with the present invention, the combination includes a protection circuit having first and second hybrid couplers which in normal operation divide the input RF power or the output RF power between a pair of transmission lines. In normal operation, the input signal would be divided in the first coupler and then summed in the second coupler and applied to the receiver. In the transmission mode the transmitter power would be divided in the second coupler, passed through the transmission lines and then summed in the first coupler and applied to the multiplexer for application to the common RF transmission means. In the case where RF power from another transmitter has not been rejected by the band reject filter, a directional coupler senses the presence of power in the wrong direction and forward biases a pair of PIN diodes to shunt the transmission lines to ground and to cause the first hybrid coupler to apply the power to a load rather than ultimately to the receiver of the particular channel, thus protecting the receiver from damage. In order to prevent that shunting operation from occurring when the transmitter in that channel is operating and a mismatch is present in the multiplexer, for example, a further directional coupler operating in the reverse direction is provided so as to inhibit the shunting action when the channel's transmitter is operating.

These and other advantages of the invention will be understood as the following detailed description of the invention is read.

DESCRIPTION OF THE PREFERRED EMBODIMENTS

Figure 1:
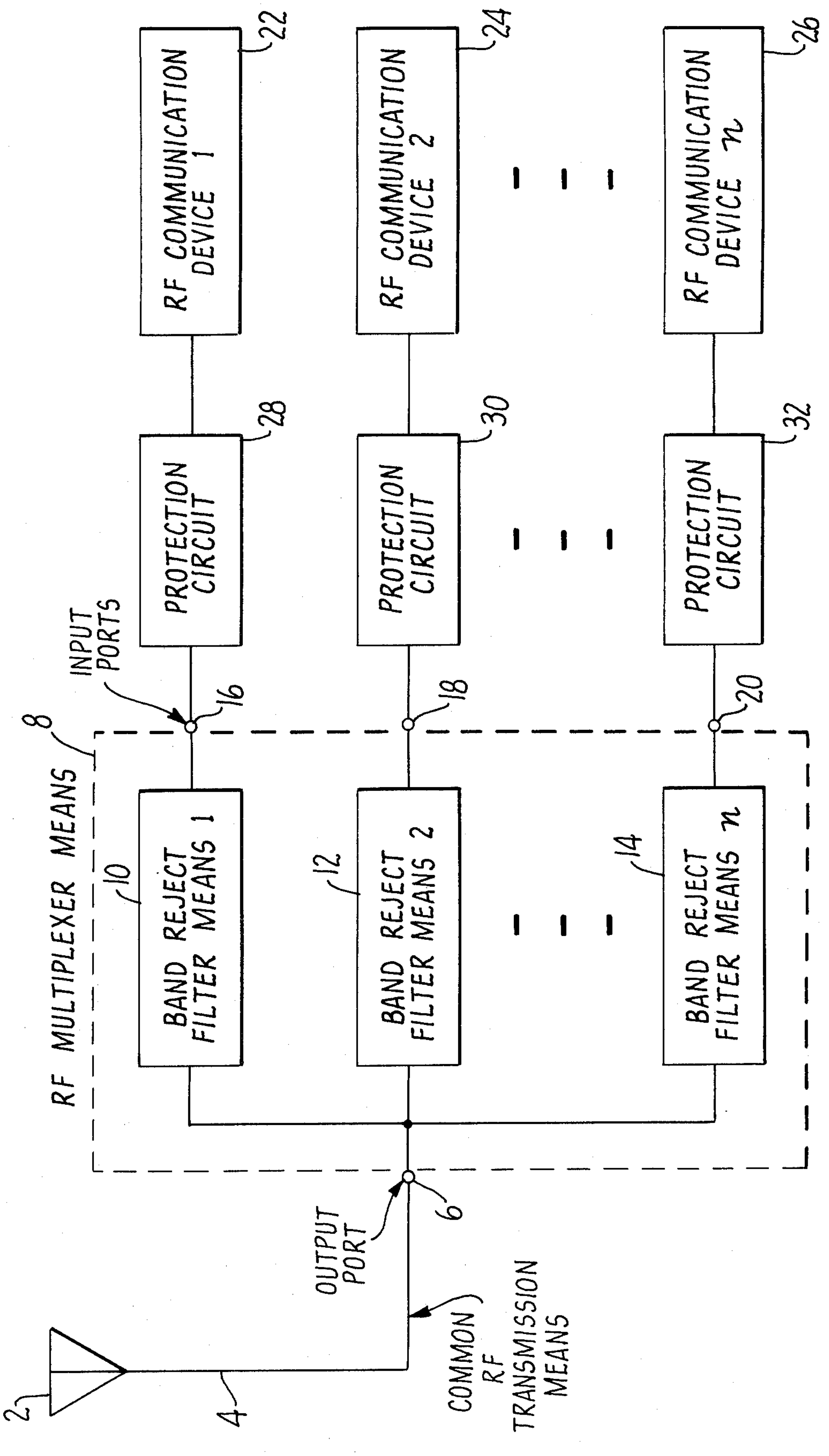
FIG. 1 is a block diagram of the overall arrangement of the present invention.

Referring now to FIG. 1 that shows a block diagram of the overall arrangement of one preferred embodiment of the present invention. A common RF transmission means, such as an antenna 2 and transmission line 4 is connected to the output port 6 of an RF multiplexer means 8. The latter means may include a plurality of *n* (where *n* can be any number) band reject filter means commensurate with the number of RF communication devices that are to be connected to the common RF transmission means. Thus in the Figure band reject filter means 10, 12 and 14 are shown, it being understood that the number of such means will be chosen to fit the particular application. In the most common situation, that of an RF diplexer, two such band reject filter means will be provided, there being two RF communication devices in that case. The band reject filter means are connected through input ports 16, 18 and 20 to a plurality of *n* RF communication devices 22, 24 and 26 through a plurality of *n* protection circuits 28, 30 and 32. The RF communication devices may either be transmitters, receivers or combination transmitter/-receiver (transceivers). The protection circuits 28, 30 and 32 are each identical and are shown in further detail in FIG. 2. No tuning or adjustment of the protection circuits are required. However, the band reject filter means 10, 12 and 14 must be designed and tuned with respect to the operating frequenices of the RF communication devices 22, 24 and 26. Thus, in order to minimize the receipt of RF energy at communication device 1 from communication device 2 and *n*, the band reject filter means 1 must reject the transmitting frequencies of devices 2 and *n*. So long as proper operation of the communication devices 22, 24 and 26 is assured and the band reject filter means 10, 12 and 14 are properly adjusted, there would be no need to provide the protection circuits 28, 30 and 32. However, in actual practice mistuning of transmitters and off frequency operation of transmitters occurs, thus requiring a fail safe protection should the band reject filter means pass undesired RF energy to a communication device. If the particular communication device is a receiver or a transceiver operating in the receive mode, such energy could damage or render inoperative the input circuits to the receiver.

Figure 2:
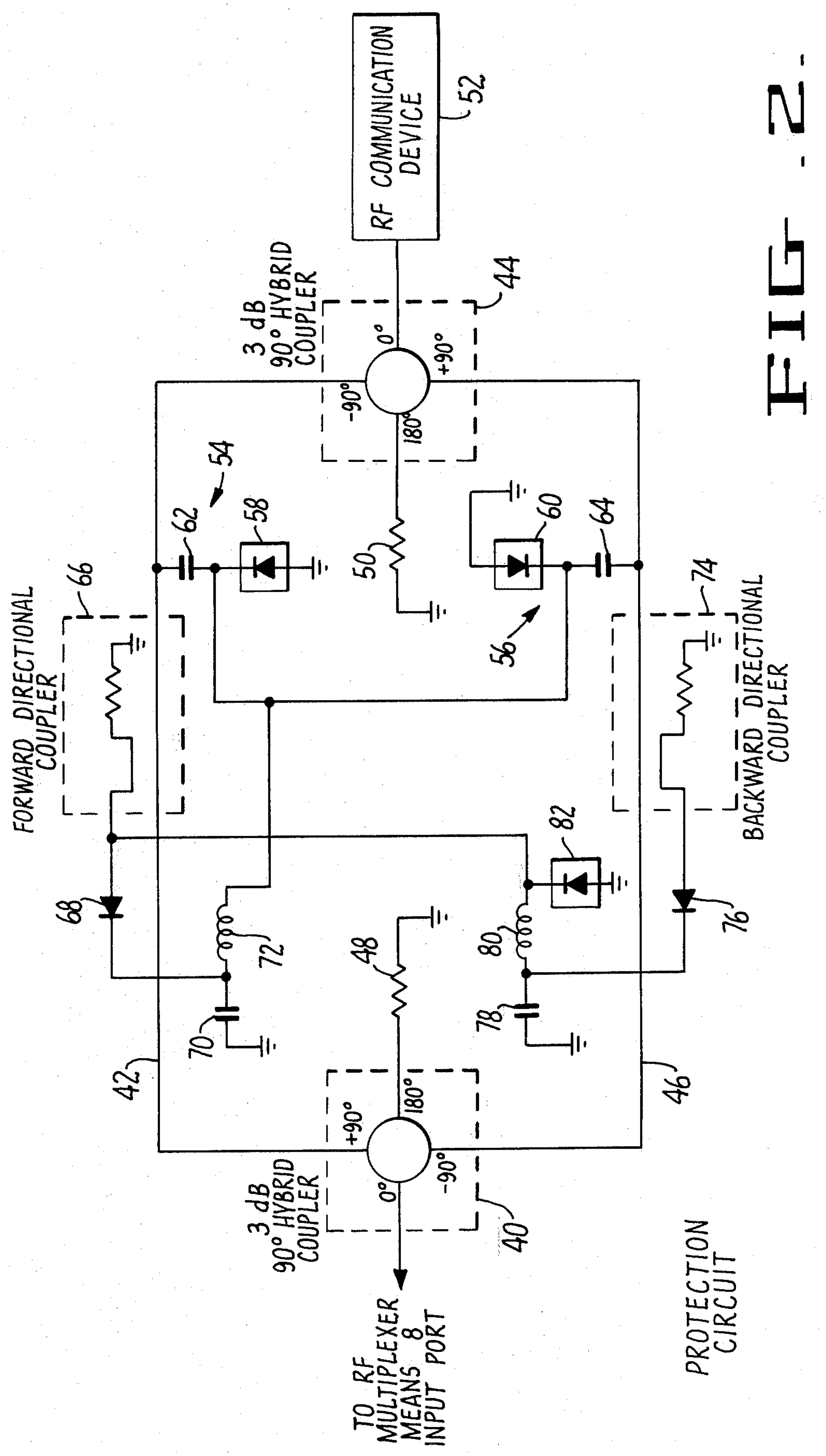
FIG. 2 is a schematic circuit diagram of a protection circuit of FIG. 1.

FIG. 2 shows a circuit diagram of the protection circuits 28, 30 and 32, all of which are identical. An input port of the RF multiplexer means 8 is applied to one arm of a 3dB 90° hybrid coupler 40. Such couplers are variously known in the art as a hybrid ring, a hybrid junction, a magic ring, etc. The particular type of hybrid coupler used herein has four arms equally spaced 90 electrical degrees for dividing power equally between the two arms that are spaced +90° and −90° from an arm receiving power when the two arms spaced +90° and −90° are terminated in their characteristic impedance and for applying power to the arms spaced 180° from an arm receiving power when the two arms spaced +90° are not terminated in their characteristic impedance. The four arms of coupler 40 shown in FIG. 2 are arbitrarily labeled 0°+90°, 180° and −90°. The 0° arm is connected to the RF multiplexer means 8 input port 16, 18 or 20. The characteristic impedance of the coupler and transmission lines in the present embodiment is nominally 50 ohms, which is conventional. The +90° arm of coupler 40 is connected to a first transmission line means 42, which is connected to the −90° arm of a further 3dB 90° hybrid coupler 44. The −90° arm of coupler 40 is connected to the +90° arm of coupler 44 through a second RF transmission line means 46. The characteristic impedance of the second hybrid coupler 44 and the first and second RF transmission line means 42 and 46 are all nominally 50 ohms. In a VHF application of the present invention, the couplers 40 and 44 and the transmission lines 42 and 46 are manufactured from strip line material. However, any suitable RF techniques may be employed. In the case of microwave frequencies, suitable wave guides and microwave couplers would, of course, be provided.

The 180° arms of couplers 40 and 44 are connected to resistors 48 and 50, the other ends of which are connected to ground to provide first and second load means, respectively. The resistors 48 and 50 are nominally 50 ohms and of sufficient wattage to handle the amount of power that would be applied in the event that all of the power flowing in the protection circuit were directed to these loads.

It will be appreciated from an analysis of the connection of the hybrid couplers 40 and 44 that when power is being received by the protection circuit from the input port that coupler 40 splits the power equally between transmission lines 42 and 46 and that coupler 44 combines the power in the two lines to sum them for application to the RF communication device 52, which is connected to the 0° arm of coupler 44. Controllable shunting means 54 and 56 are connected between the transmission lines 42 and 46 and ground so as to decrease the RF resistance between the transmission lines and ground to thereby direct the power received by the 0° arm of coupler 40 into the load 48. The shunting means 54 and 56 each comprise the PIN diodes 58 and 60 in series with DC blocking capacitors 62 and 64. In the absence of forward bias on the PIN diodes, their nominal shunt resistance is in the order of 2,000 to 3,000 ohms, thereby having no effect on transmission lines 42 and 46. A forward directional coupler 66 coupled to transmission line 42 picks up energy in the transmission line when the power is flowing from the input port. This signal is rectified by diode 68 and smoothed by filter capacitor 70 for application through RF choke 72 to provide forward bias to the PIN diodes 58 and 60. The rectified current from forward directional coupler 66 has a magnitude depending on the power of the signal flowing through transmission line 42. Thus, the amount of forward bias developed across the PIN diodes will vary, consequently varying the resistance of the PIN diodes. As the forward bias developed increases the resistance of the diodes decreases, thus causing more and more energy to flow into load 48. Since equal amounts of power are flowing in transmission lines 42 and 46 the forward directional coupler 66 may be coupled to either of the transmission lines. Since the power in the two lines is substantially identical, only a single directional coupler is required to control the PIN diodes shunting the two transmission lines. It will be apparent that power in this forward direction from the input port will be present in the transmission lines 42 and 46 only in the instance when the band reject filter means of the RF multiplexer means of FIG. 1 is for some reason not rejecting RF energy that it is ordinarily intended to reject. Thus, the controllable shunting provided by the PIN diodes provides a fail safe protection by diverting the RF power into load 48 instead of into the RF communication device 52, which would possibly damage the receiver or receiver portion of the transceiver.

When receiving a typical signal only microwatts of power are received from the input port. This is below the level of significant conduction for the rectifying diode 68 so that little or no forward bias current is applied to PIN diodes 58 and 60, thus not attenuating the received signal.

In the case when the RF communication device 52 is transmitting, the power will ordinarily be split between transmission lines 42 and 46 and then summed in the 0° arm and applied to the input port of the RF multiplexer means 8 of FIG. 1. In order to prevent the shunting means 54 and 56 from operating when a signal is being transmitted by device 52 and is being reflected from the input port, for example, by a mismatch of impedances, thereby causing the forward directional coupler 66 to sense the presence of power in that direction, a backward directional coupler 74 is provided. Directional coupler 74 senses power flowing from the RF communication device 52 to provide a signal which is rectified by diode 76 and smoothed by filter capacitor 78 to apply a current through RF choke 80, which develops forward bias across a further PIN diode 82. Diode 82 is shunted between the output of the forward directional coupler 66 and ground so that in the absence of forward bias it shows a high resistance of 2,000 to 3,000 ohms and has no effect on the operation of the circuit. However, when the device 52 is transmitting PIN diode 82 is forward biased in order to inhibit the output of the forward directional coupler 66 and thus inhibit the shunting means 52 and 60 from becoming operative.

The RF multiplexing apparatus thus described provides a simple and inexpensive means for providing fail safe protection against the improper operation of transmitting devices used with such an RF multiplexer. The invention is particularly useful for application where untrained operators are using the RF communication devices.

In one particular working embodiment of the invention, the forward directional coupler 66 was chosen to be a 20dB coupler. With 30 watts received at the hybrid coupler 40 from the input port, a forward biasing current of 50 milliamperes was generated, thereby providing an isolation at the 0° arm of coupler 44 of greater than 30dB. For 0.3 watts from the input port, greater than 20dB isolation was provided.

Various modifications of the preferred embodiments disclosed will be apparent to those of ordinary skill in the art. For example, although PIN diodes have been disclosed as the shunting means, any equivalent devices operable in the frequency range of interest may be used. The basic requirements of the shunting means being to provide a relatively low loss high passive resistance when no bias or reverse bias is applied (the off mode) and a low resistance when forward bias is applied (the on mode). The invention is therefore to be limited only by the scope of the appended claims.

I claim:

1. Apparatus for simultaneously connecting a plurality of RF communications devices to a common RF transmission means comprising:

RF multiplexer means including a plurality of input ports for connection to said communications devices and an output port for connection to said common transmission means, a plurality of protection circuit means each connected between one of said input ports and one of said communications devices, each of said protective circuit means including:

first hybrid coupler means having four arms equally spaced 90 electrical degrees for dividing power equally between the two arms spaced +90° and −90° from an arm receiving power when the two arms spaced +90° and −90° are terminated in their characteristic impedance and for applying power to the arm spaced 180° from an arm receiving power when the two arms spaced +90° and −90° are not terminated in their characteristic impedance, one of said four arms, the 0° arm, of said first hybrid coupler means connected to said one of said input ports, first load means, the 180° arm of said first hybrid coupler means connected to said first load means, first RF transmission line means, second RF transmission line means, the +90° arm connected to said first transmission line means, the −90° arm connected to said second transmission line means, first directional coupler means for sensing RF power flowing from said one of said input ports in said first or second transmission line means to provide a first current proportional to said RF power, controllable shunting means responsive to said first current connected between said first and said second transmission line means and ground, respectively, for decreasing the RF resistance between said first and second transmission line means and ground, respectively, as said current increases, second hybrid coupler means having four arms equally spaced 90 electrical degrees for dividing power equally between the two arms spaced +90° and −90° from an arm receiving power when the two arms spaced +90° and −90° are terminated in their characteristic impedance and for applying power to the arm spaced 180° from an arm receiving power when the two arms spaced +90° and −90° are not terminated in their characteristic impedance, one of said four arms, the 0° arm, of said second hybrid coupler means connected to said one of said communications devices, second load means, the 180° arm of said second hybrid coupler means connected to said second load means, the −90° arm connected to said first transmission line means, and the +90° arm connected to said second transmission line means.

2. The combination of claim 1 wherein said controllable shunting means comprises first and second PIN diodes connected between said first transmission line means and ground and between said second transmission line means and ground, respectively, and said diodes receiving said first current to provide forward bias.

3. The combination of claim 1 further comprising second directional coupler means for sensing RF power flowing toward said one of said input ports in said first or second transmission line means to provide a second current proportional to said RF power, and means receiving said second current for inhibiting said first current when said second current is present.

4. The combination of claim 2 further comprising second directional coupler means for sensing RF power flowing toward said one of said input ports in said first or second transmission line means to provide a second current proportional to said RF power, and means receiving said second current for inhibiting said first current when said second current is present.

5. The combination of claim 4 wherein said means for inhibiting includes a third PIN diode shunted across the output of said first directional coupler, said third PIN diode receiving said second current to provide forward bias.

6. The combination of claim 1 wherein said RF multiplexer means comprises band reject filter means connected between said input ports and said output port.

7. The combination of claim 2 wherein said RF multiplexer means comprises band reject filter means connected between said input ports and said output port.

* * * * *